United States Patent [19]

Odajima

[11] Patent Number: 4,921,559

[45] Date of Patent: May 1, 1990

[54] PROCESS OF MAKING AN ACOUSTIC CARBON DIAPHRAGM

[75] Inventor: Hideo Odajima, Fujioka, Japan

[73] Assignee: Mitsubishi Pencil Co., Ltd., Tokyo, Japan

[21] Appl. No.: 319,705

[22] Filed: Mar. 7, 1989

[51] Int. Cl.[5] ........................ B29C 65/54; C01B 31/02

[52] U.S. Cl. .................................... 156/242; 156/327; 156/337; 264/29.6; 264/134; 264/250; 423/445; 423/448; 423/449; 427/228

[58] Field of Search .................... 264/29.1, 29.5, 29.6, 264/134, 250; 423/445, 448, 449; 427/227, 228; 156/242, 327, 337

[56] References Cited

U.S. PATENT DOCUMENTS

| | | | |
|---|---|---|---|
| 3,626,042 | 12/1971 | Appleby et al. | 264/29.1 |
| 4,395,814 | 8/1983 | Tsukagoshi et al. | 423/445 X |
| 4,456,645 | 6/1984 | Chi | 264/29.1 X |
| 4,855,093 | 8/1989 | Yoshida | 264/29.6 |

FOREIGN PATENT DOCUMENTS

| | | | |
|---|---|---|---|
| 39-25287 | 11/1964 | Japan | 264/29.1 |
| 58-201496 | 11/1983 | Japan | 264/250 |
| 60-121895 | 6/1985 | Japan | 423/449 |

*Primary Examiner*—Jeffery Thurlow
*Assistant Examiner*—Leo B. Tentoni
*Attorney, Agent, or Firm*—Oliff & Berridge

[57] ABSTRACT

A process for producing a diaphragm for an acoustic device of carbonaceous materials which has the steps of mixing and kneading an organic mixture composition containing one or more or mixtures of a monomer, prepolymer and low polymer of relatively polymerizable thermosetting resin of a substance exhibinting high carbon residual yield after calcining with carbon powders as a binder, preliminarily molding the same in a film or sheet shape, calcining a diaphragm molding molded in a desired diaphragm shape and a voice coil bobbin molding molded in a desired voice coil bobbin shape from the film or sheet-like molding and then forming an integral structure of the diaphragm and the voice coil bobbin by calcining a composite material integrated with the diaphragm molding and the voice coil bobbin molding by an organic liquid composition exhibiting high carbon residual yield in an inert gas atmosphere. Thus, the process can transmit a driving force generated in a voice coil to the diaphragm without loss and without ageing fatigue, such as a creep of the materials irrespective of external environments.

10 Claims, 1 Drawing Sheet

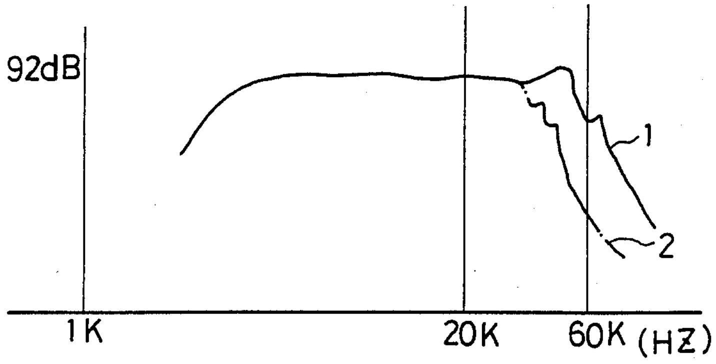
92dB
1K
20K
60K
(HZ)
1
2

PROCESS OF MAKING AN ACOUSTIC CARBON DIAPHRAGM

BACKGROUND OF THE INVENTION

The present invention relates to a process for producing a diaphragm for an acoustic device of fully carbonaceous materials. More particularly, the invention relates to a process for producing an acoustic carbon diaphragm having a high hardness, a high strength and a high elasticity as compared to a diaphragm manufactured from a conventional diaphragm material. The diaphragm may be used as a speaker and a microphone. It exhibits less deformation by an external force due to excellent rigidity, as well as low sound distortion, a wide sound reproduction range, and distinct sound quality. In addition, the diaphragm imparts a high rigidity to an entire vibration system owing to an integrated structure of the diaphragm and a voice coil bobbin, which eliminates energy loss during transmission of a driving force generated in a voice coil to the diaphragm, thereby providing an excellent responsiveness to an input signal. The diaphragm is suitable for digital audio applications.

A diaphragm intended for a speaker and a voice coil bobbin should possess the following properties:

(1) low density, (2) high Young's modulus, (3) high sound propagating velocity, (4) adequately large internal loss of vibration, (5) stability against variation in the atmospheric conditions, no deformation nor change of properties, and (6) suitability for a simple and inexpensive manufacturing process.

More specifically, the material for the diaphragm is required to have a wide sound reproduction range in high-fidelity over a broad frequency band. To efficiently and distinctly produce sound quality, the material should have high rigidity, with no distortion such as creep against external stress. To further increase the sound velocity from the equation of $$V=(E/p)^{\frac{1}{2}}$$

where V: sound velocity, E: Young's modulus, p: density, the material is required to have small density and high Young's modulus.

In addition to the above-mentioned conditions, in the case of a voice coil bobbin, the material should be resistant to the Joule heat generated by a voice current flowing in a voice coil.

The conventional materials for the diaphragm and voice coil bobbin include paper (pulp), plastic, aluminum, titanium, magnesium, beryllium, boron as basic materials, and further contain glass fiber, carbon fiber compositely mixed with the basic material, or processed to metal alloy, metal nitride, metal carbide, or metal boride. However, the paper, plastic and their composite materials have a small Young's modulus and small density. Thus, the sound velocities of these materials are low. Vibration division occurs in a specific mode and the frequency characteristics in the high frequency band of the materials are particularly low, resulting in difficulty in producing distinct sound quality. In addition, these materials are feasibly affected by their external environment such as temperature and moisture, causing deterioration in the quality and ageing fatigue, thereby disadvantageously decreasing the characteristics.

Plates of aluminum, magnesium, or titanium have also been employed. The sound velocities of these materials are high, but the materials have sharp resonance phenomenon in high frequency band with small internal loss of vibration, or ageing fatigue such as creep occurs in the materials, thereby disadvantageously deteriorating their characteristics.

Boron, beryllium, and their nitrides, carbides and borides provide excellent physical properties. Tweeters which use these materials in their diaphragms possess sound reproduction limits in the audible frequency bands or higher, thereby correctly producing natural sound quality without transient phenomenon by the signals in the audible band. However, these materials are very expensive, and are difficult to machine. In particular, the conventional process for producing a diaphragm by rolling and press molding is not practical and a depositing method such as C.V.D. or P.V.D. should be employed. These processes are expensive and it is difficult to produce speakers of large size.

Because the conventional material for the voice coil bobbin is typically paper (pulp), such as kraft paper, the rigidity of the entire vibration system decreases even if materials having excellent physical properties are used for a diaphragm. The rigidity of the entire vibration system also decreases due to the presence of a bonding layer for bonding the diaphragm to the voice coil bobbin, and an energy loss occurs at the bonding layer when transmitting the driving force generated in the voice coil to the diaphragm.

SUMMARY OF THE INVENTION

Accordingly, an object of the present invention is to provide a process for producing a diaphragm for an acoustic device of completely carbonaceous materials, which can eliminate the above-described disadvantages associated with conventional materials for diaphragms and voice coil bobbins. Another object is to provide a process for manufacturing a diaphragm which can receive a driving force generated in a voice coil without energy loss and without ageing fatigue, such as creep, irrespective of external environments, such as temperature and moisture. Yet another object is to provide a process which can provide a diaphragm with excellent heat resistance, which has an integral structure of the diaphragm and the voice coil bobbin, can faithfully reproduce a wide frequency range from a low sound range to a high sound range, and which can generate a distinct quality of tone.

The inventor has discovered a process for producing a diaphragm for an acoustic device of completely carbonaceous materials comprising the steps of mixing and kneading an organic mixture composition containing one or more or mixtures of a relatively polymerizable thermosetting resin monomer, prepolymer and low polymer, which exhibits a high carbon residual yield after calcining, together with one or more types of carbon powders such as natural graphite, artificial graphite, kish graphite, carbon black, and coke powders, preliminarily molding the same in a film or sheet shape, calcining a diaphragm molding molded into a desired diaphragm shape and a voice coil bobbin molding molded into a desired voice coil bobbin shape from the film or sheet-like molding and then forming an integral structure of the diaphragm and the voice coil bobbin by calcining a composite material integrated with the diaphragm molding and the voice coil bobbin molding by an organic liquid composition exhibiting high carbon residual yield in an inert gas atmosphere.

The word "carbon" in this specification comprises both carbonaceous and graphite properties.

BRIEF DESCRIPTION OF THE DRAWING

The FIGURE is a graph showing the comparison in the frequency characteristic of a tweeter of Example 1 with a tweeter bonded by an ordinary adhesive, where the ordinate axis indicates frequency characteristic, and the abscissa axis indicates frequency in Hz.

DESCRIPTION OF THE PREFERRED EMBODIMENTS

A monomer, prepolymer or low polymer of relatively easily polymerizable thermosetting resin of a substance exhibiting high carbon residual yield after calcining is mixed with one or more types of carbon powders in a high speed agitator, such as a Henschel mixer. The mixture is then kneaded into a paste-like composition by a kneader capable of imparting a high shearing force, such as ball mills, three rolls or two rolls. Then, a predetermined amount of hardener is added to the paste-like composition, and the mixture is again kneaded to disperse the hardener. Air bubbles may be removed through a reduced pressure defoaming machine, if necessary. The obtained raw liquid is then preliminarily molded into a film or sheet of the desired thickness via coater or a calender rolls by using a back sheet having a separable film.

Then, the back sheet of the film or sheet is removed when the raw liquid has solidified into a B-stage resin having plasticity (not hardened) which is molded into the shape of a desired diaphragm by a press molding machine, a vacuum molding machine or blow-molding machine. In this case, the plasticity of the film or sheet may be suitably increased by adequately heating or it may be hardened by reaction. After the material is sufficiently hardened, the film or sheet is removed from the mold, and the molded film or sheet is removed.

The molded film or sheet obtained by the above-mentioned operation is cut into a rectangular shape of desired shape, and the back sheet is then removed. The film or sheet is wound on a round rod or a pipe having a desired diameter, dimensions, and a smooth surface as a supporting base, and fixedly secured at both ends thereof. The voice coil bobbin molding obtained by the above-mentioned operation is heated at 50° to 300° C., sufficiently cured, and then is removed from the mold.

The diaphragm molding and the voice coil bobbin molding obtained by the above-mentioned operations are further insolubilized and infusibilized in a heated air oven at an ambient temperature or heated, and then bonded together by an organic liquid composition.

The organic liquid compositions useful in the present invention include thermoplastic resins, such as polyvinyl chloride and chlorinated vinlyl chloride resin; thermosetting resins, such as phenyl resin, furan resin and polyimide; natural high molecular weight substances, such as tragacanth gum; asphalt pitches, such as petroleum asphalt and coal tar pitch; and one or more types of compositions of dry distilled pitches obtained by dry distilling organic high molecules. Carbon powders, such as natural graphite and artificial graphite, carbon black, coke powder, and wooden carbon, etc. may be added to 5 to 50 wt. % so as to strengthen the bond of the diaphragm and the voice coil bobbin during carbonization.

The organic high molecular substances or pitches are not in the liquid state at ambient temperatures. Among these a solution of the initial condensate of the materials, or thermally melted materials may be preferably used. The organic liquid composition may be coated between the diaphragm molding and the voice coil bobbin molding, and bonds by heating and by removing its solvent to solidify it.

The carbonaceous powders used in the present invention include one or more types of natural graphite, artificial graphite, kish graphite, superhigh elastic modulus graphite fiber, carbon black, wooden carbon powder, etc., in such a manner that the grain size of the carbonaceous powder is preferably 0.1 to 200 microns of mean grain size. The superhigh elastic modulus graphite fiber is preferably 3 mm or less of fiber length. From 10 to 90 wt. %, more preferably 20 to 80 wt. %, of carbonaceous powder is added to the whole quantity of the mixture. In order to develop the superhigh elastic modulus function, it is preferable to employ highly crystallized natural graphite and superhigh elastic modulus graphite fiber.

The monomer, prepolymer and low polymer of the thermosetting resins include furan resins, phenol resins, xylene resins, epoxy resins, and bismaleimide triazine resins. Among those, furan resins such as furfuryl alcohol/furfurals, furfural/phenols, furfural/ureas, phenol resins such as resoles, novolacs, and their mixture resins are preferred due to the easiness of operation and molding workability. From 10 to 90 wt. %, preferably 20 to 80 wt. %, of the whole mixture is added, or more preferably 30 to 80 wt. % is added to avoid problems in workability and shape retentivity after calcining.

The binder capable of being mixed with the thermosetting resin preferably includes thermosetting resins, such as polyvinyl chloride, polyacrylonitrile, polyvinyl alcohol, polyvinyl chloride vinyl acetate copolymer, etc., natural polymer substances, such as lignin and cellulose, etc., asphalt pitches, such as petroleum asphalt, coal tar pitch, and naphtha decomposed pitch, vinyl chloride pitch suitable to be decomposed with an organic solvent, such as MEK, THK, etc., selected in response to the objects and as required.

The diaphragm, the voice coil bobbin and the organic liquid composition preferably use the same composition to avoid non-uniform shrinkage at calcining time.

The integral structure obtained by the above-described operation is contained in a calcining sheath, and thermally calcined to be carbonized at 1000° to 1500° C. in an inert gas phase of nitrogen or argon. In the calcining and carbonizing steps, it is important to gradually heat the structure at a temperature rising velocity of 50° C./hr. or lower, preferably 20° C./hr. or lower, up to 500° C. so as to prevent it from being deformed and cracked. In a range or 500° C. or higher, the structure is heated at a temperature rising velocity of 20° to 200° C./hr. more preferably 50° to 100° C./hr. for economic reasons, and then maintained at the highest temperature for 1 to 5 hours so as to obtain the homogeneous property of carbonization, and finally allowed to cool naturally.

EXAMPLES

The following examples are provided to illustrate the process for producing a diaphragm for an acoustic device of fully carbonaceous materials, but the present invention is not limited to these particular examples.

EXAMPLE 1

75 wt. % of initial condensate of furfuryl alcohol/furfural resin (VF-302 produced by Hitachi Chemical Co., Ltd., Japan) and 25 wt. % of natural flaky graphite (having 1 micron of mean particle size) were mixed in a Warner mixer to be uniformly dispersed, and further highly dispersed by three rolls cooled with water for ink kneading, to produce a material paste composition. 4 wt. % of p-toluenesulfonic acid-50%-methanol solution was added as a hardener to 100 wt. % of the material paste composition, and the mixture was then defoamed through a reduced presure defoaming machine while sufficiently agitating keep room temperatures by a high velocity homogeneous mixer.

The raw solution so prepared was coated on a back sheet having an exfoliating membrane by a coater having a doctor blade to produce a 90 micron thick layer, which was preliminarily hardened. A preliminarily molded sheet having a sufficiently soft plasticity (B-stage state) was obtained.

Then, the back sheet was removed, and the composition was molded into a dome shape by a vacuum molding machine which used a domed molding die having a bore of 27 mm in diameter. The molding was thermally hardened by 80° C. hot air and removed from the mold to produce a diaphragm molding.

A preliminarily molded sheet having a thickness of 70 microns obtained by procedures similar to the above operations was cut into a 85×6 mm rectangle. The back sheet was removed and the sheet was wound on a ceramic pipe having a 27 mm outer diameter and a smooth surface, and fixed at both ends thereof. Then, the wound sheet on the pipe was held at 100° C. for 10 hours and further 180° C. for 24 hours in an air oven to be insolubilized and infusibilized. The cured molding was removed from the ceramic pipe to produce a voice coil bobbin molding.

The bottom of the dome of the diaphragm molding was bonded to the voice coil bobbin molding using an organic liquid composition. The organic liquid composition was formulated by adding 2 wt. % of A-3 hardener (produced by Hitachi Chemical Co., Ltd., Japan) to the furan initial condenstate, and agitating the mixture. The bonded assembly was allowed to stand at ambient temperature for 3 hours to solidify the organic liquid composition, further heated to 180° C. to be insolubilized and infusibilized, then contained in a calcining sheath, heated at a temperature rising velocity of 15° C./hr. up to 500° C. in a nitrogen gas atmosphere furnace, and then heated at a temperature rising velocity of 50° C./hr. from 500° C. to 1000° C. Subsequently, the bonded assembly was held at 1000° C. for 3 hours, then allowed to naturally cool, thereby obtaining an integral structure in which the completely carbonaceous diaphragm was bonded to the completely carbonaceous voice coil bobbin by means of carbon.

The completely carbonaceous dome-shaped diaphragm (a tweeter for reproducing a high frequency sound range) obtained in this matter had a diameter of 23 mm and a thickness of 50 microns diaphragm. The voice coil bobbin had an outer diameter of 23 mm, a height of 5 mm, and a thickness of 50 microns, an elastic modulus of 175 GPa, a sonic velocity of 11.0 km/sec., an internal loss of tan $\delta 9.0\times10^{-3}$, and a density of 1.45 g/cm$^3$.

EXAMPLE 2

70 wt. % of resole phenol resin (PL-2818 produced by Gunei Chemical Co., Ltd., Japan) and 30 wt. % of carbon black (MA-8 produced by Mitsubishi Chemical Industries, Ltd., Japan) were mixed to produce a material paste composition using procedures similar to those of Example 1. Then, a preliminarily molded sheet having 1.1 mm of thickness was obtained by a similar operation. This sheet was dried, a back sheet was then removed, and the sheet molded in a press molding machine mounted with a metal mold set at 150° C. into a cone shape having 32.0 cm in diameter of bore, hardened, and removed from the molds, thereby obtaining a diaphragm molding.

The above-mentioned material paste composition was also used to obtain a preliminarily molded sheet having 0.6 mm of thickness obtained by operations similar to those of Example 1. The sheet was cut into a size of 220×35 mm, and the back sheet was then removed. The cut sheet was wound on a cylindrical metal mold having 7.0 cm in outer diameter and smooth surfaces, fixed at both ends thereof, thermally cured in a press molding machine held at 170° C. at the metal mold for 15 minutes, and removed from the mold, thereby obtaining a voice coil bobbin molding. Then the diaphragm molding and the voice coil bobbin molding were bonded together using an organic liquid composition similar to that in Example 1. The liquid composition was solidified at 100° C. in a heating oven, and further heated to 180° C. Then, similar to Example 1, it was calcined to 1300° C. to bond the completely carbonaceous diaphragm to the completely carbonaceous voice coil bobbin by means of carbon into an integral structure.

The completely carbonaceous cone-type diaphragm (a woofer for reproducing low frequency sound range) thus obtained had a size of 27.5 cm in diameter of bore, and 0.8 mm of thickness. The voice coil bobbin had the following physical properties: an outer diameter of 6.0 cm, a height of 3.0 cm, a thickness of 0.5 mm, an elastic modulus of 126 GpA, a sonic velocity of 9.5 km/sec., an internal loss of tan $\delta 15\times10^{-3}$, and a density of 1.40 g/cm$^3$.

EXAMPLE 3

30 wt. % of initial condensate of furfuryl alcohol/furfural resin (VF-302 produced by Hitachi Chemical Co., Ltd. Japan) and 20 wt. % of polyvinyl chloride resin (having 800 of mean polymerization produced by Nippon Zeon Co., Ltd., Japan) were dissolved in tetrahydrofuran, 20 wt. % of dibutylphthalate was added, the resultant mixture was then used as the raw material of a carbonization binder, 50 wt. % of natural flaky graphite (having a mean grain size of 1 micron) was mixed, and the resultant mixture was treated in a manner similar to that of Example 1. The solvent was then volatilized to be removed, and a preliminarily molded sheet having a thickness of 120 microns was produced.

Then, the back sheet was removed, and the composition was then molded into a dome shape by a press molding machine which used a domed molding die having a bore of 65 mm in diameter. The domed molding was thermally preliminarily hardened by hot air at 180° C., and removed from the mold to produce a diaphragm molding.

A voice coil bobbin was produced from a preliminarily molded sheet having a thickness of 90 microns which was obtained in a manner similar to the above operation. The sheet was cut in a fashion similar to Example 1 and heated to 180° C. to produce a voice coil bobbin molding having a 65 mm outer diameter, 8 mm height and a thickness of 90 microns.

The organic liquid composition was formulated by adding 1 wt. % of A-3 hardener (produced by Hitachi Chemical Co., Ltd., Japan) to the mixture, which was then sufficiently agitated, and mixed. The diaphragm and voice coil bobbin were bonded together to form an assembly using the organic liquid composition in a manner similar to that of Example 1. The solvent was volatilized at 100° C. in a heating oven to solidify the liquid material, and further treated in an air oven heated to 240° C. for 8 hours to completely remove the plasticizer. The furan resin was completely cured with HCl gas generated by the decomposition of the polyvinyl chloride resin. In a manner similar to Example 1, the assembly was then calcined to 1200° C. to produce an integral structure of a carbonaceous diaphragm and a carbonaceous voice coil bobbin bonded together by carbon.

The completely carbonaceous dome-shaped diaphragm (a squawker for reproducing an intermediate frequency sound range) obtained in this manner had a diameter of 60 mm, and a thickness of 80 microns. The voice coil bobbin had an outer diameter of 60 mm, a height of 7 mm, and a thickness of 80 microns, an elastic modulus of 106 GPa, a sonic velocity of 8.0 km/sec, an internal loss of tan $\delta 20.0\times10^{-3}$, and a density of 1.65 $g/cm^3$.

Table 1 compares the properties of the diaphragm obtained by Example 1–3 to diaphragms prepared from conventional materials. The conventional diaphragms are similar to the tweeter of Example 1, in which the diaphragm and the voice coil bobbin are separately molded and calcined independently under the same conditions, but bonded with an ordinary adhesive instead of an intermediate carbon bonding layer.

TABLE 1

| Diaphragm Materials | Properties: Sound velocity (km/sec.) | Elastic modulus (GPa) | tanδ ($\times 10^{-3}$) | Density ($g/cm^3$) |
|---|---|---|---|---|
| paper (pulp) | 1.0∼2.4 | 0.2∼4.0 | 20∼60 | 0.2∼0.7 |
| polypropylene | 1.3 | 1.5 | 60 | 0.9 |
| aluminium | 5.1 | 70.0 | 2∼3 | 2.7 |
| titanium | 4.9 | 110.0 | 2∼3 | 4.5 |
| magnesium | 5.1 | 44.0 | 2∼3 | 1.7 |
| beryllium | 12.2 | 270.0 | 2∼3 | 1.8 |
| Example 1 | 11.0 | 175.0 | 9.0 | 1.45 |
| Example 2 | 9.5 | 126.0 | 15.0 | 1.40 |
| Example 3 | 8.0 | 106.0 | 20.0 | 1.65 |

As understood from the above table, the diaphragm of Example 1 exhibits excellent properties equivalent to those of the beryllium diaphragm. Moreover, the diaphragms of Examples 1–3 have a sonic velocity approximately twice as large as the conventional metal material.

Though not shown in the table, the expansion coefficients of the diaphragms of Examples 1 to 3 were 2.0 to $3.0\times10^{-6}$/° C., with an oxidation starting temperature of 400° C. or higher. Thus, the material can sufficiently endure against Joule heat generated by a voice current flowing in the voice coil.

As shown in the drawing, tweeter (1) of Example 1 has a higher frequency band limiting frequency than a conventional tweeter (2) bonded with an ordinary adhesive.

The high performance diaphragm of the present invention can be inexpensively produced by an industrially simple process. Thus, the diaphragm and the voice coil bobbin can be preformed in sufficient quantity that makes it attractive for use in digital audio equipment such as a compact disk player.

I claim:

1. A process of making an acoustic carbon diaphragm comprising the steps of:

mixing and kneading an organic composition containing at least one monomer, prepolymer or low polymer of a polymerizable thermosetting resin exhibiting high carbon residual yield after calcining and a carbon powder, preliminarily molding the organic composition into a film or sheet shape, thereby producing a sheet-like molding, calcining a diaphragm molding molded into a desired diaphragm shape and a voice coil bobbin molding molded into a desired voice coil bobbin shape from the sheet-like molding and bonding the calcined diaphragm molding to the calcined voice coil bobbin by means of an organic liquid composition to form a bonded assembly, then forming an integral structure of the diaphragm and the voice coil bobbin by calcining the bonded assembly in an inert gas atmosphere.

2. The process according to claim 1, wherein said organic liquid composition is selected from the group consisting of thermoplastic resins, thermosetting resins, natural high molecular weight substances, asphalt pitches, and dry distilled pitches obtained by dry distilling organic high molecules in which the organic high molecular substances or pitches used are not in the liquid state at ambient temperatures.

3. The process according to claim 1, wherein said thermosetting resin is selected from the group consisting of furan resins, phenol resins, xylene resins, epoxy resins, and bismaleimide resins.

4. The process according to claim 1, wherein said organic composition includes a binder selected from the group consisting of thermosetting resins, natural polymer substances, and asphalt pitches.

5. The process of claim 2 wherein said organic liquid composition is a thermoplastic resin selected from the group consisting of polyvinyl chloride, and chlorinated vinyl chloride resin.

6. The process of claim 2 wherein said organic liquid composition is a tragacanth gum.

7. The process of claim 2 wherein said organic liquid composition is an asphalt pitch selected from the group consisting of petroleum asphalt and coal tar pitch.

8. The process of claim 2 wherein said organic liquid is a dry distilled pitch.

9. The process of claim 3 wherein said thermosetting resins is a furan resin selected from the group consisting of furfuryl alcohol/furfural, furfual/phenol, and furfural/urea.

10. The process of claim 3 wherein said thermosetting resin is a phenol resin.

* * * * *